April 14, 1959  R. I. HOMIER  2,881,629
DRIVING GEARS AND SHAFT SUPPORTED IN HOUSING
Filed July 11, 1955
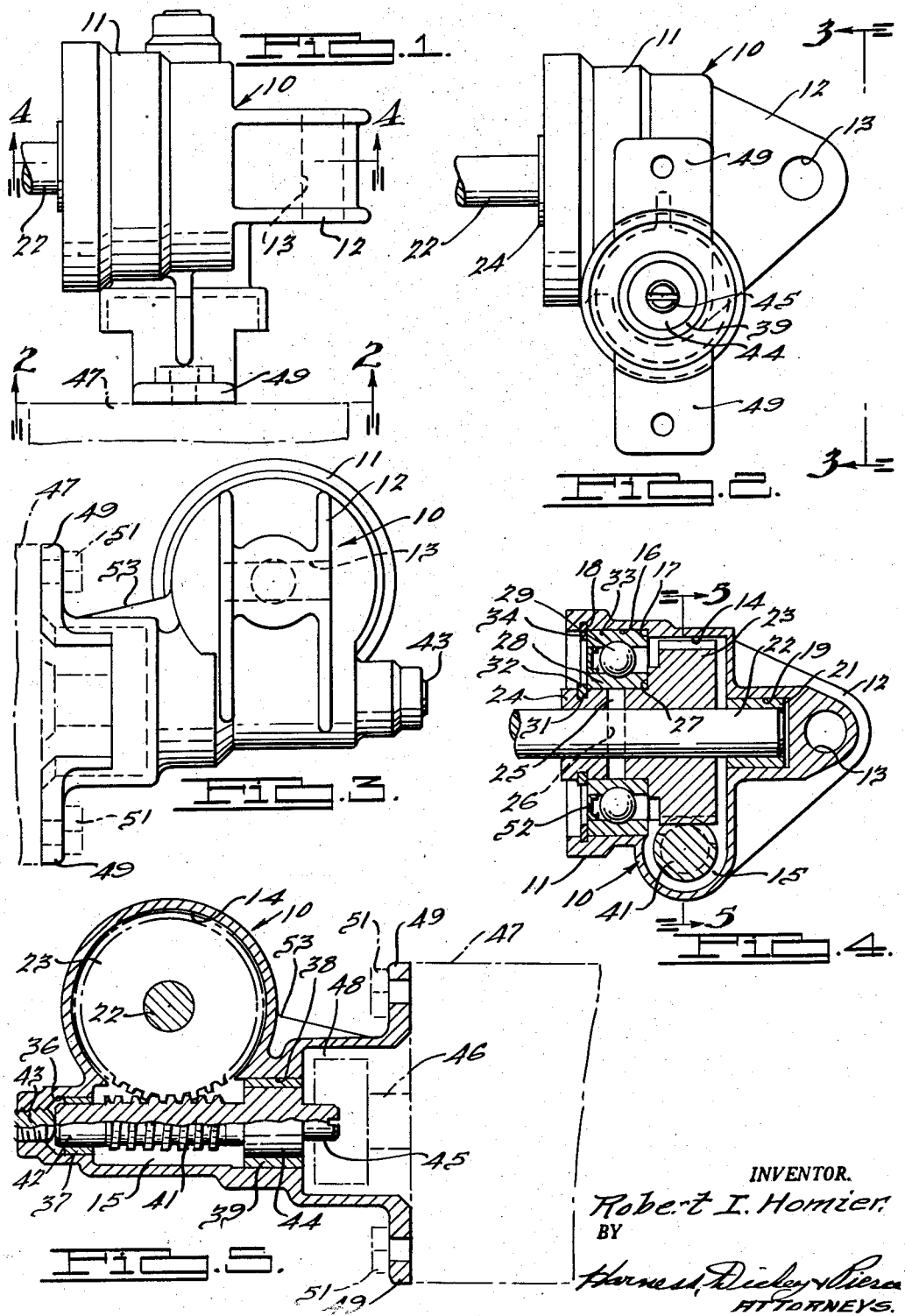
INVENTOR.
Robert I. Homier
BY
Harness, Dickey & Pierce
ATTORNEYS.

United States Patent Office 2,881,629
Patented Apr. 14, 1959

2,881,629

DRIVING GEARS AND SHAFT SUPPORTED IN HOUSING

Robert I. Homier, Detroit, Mich., assignor to American Metal Products Company, Detroit, Mich., a corporation of Michigan Application July 11, 1955, Serial No. 521,264

2 Claims. (Cl. 74—425)

This invention relates to reduction gearing and particularly to securing means for a worm and worm wheel drive within a supporting housing.

It is usually the practice in the art to employ a two-part housing for supporting a worm and worm wheel drive for a lead screw. This required two castings and a plurality of screws for securing the castings together after the assembly of the gears therein. The present invention pertains to the use of a unit casting in which the bearings for the worm wheel and adjacent end of the lead screw are secured on center relation to each other. Spaced flanges are provided on the housing for supporting the motor with the shaft thereof in driving engagement with the worm positioned in the casting between said flanges. The bearings and worm wheel are retained within the housing by a pair of split spring rings which are retained within annular grooves provided in the housing and in an extending sleeve of the worm wheel.

Accordingly, the main objects of the invention are: to provide a unit housing for encasing the worm drive for a lead screw and for supporting the motor which operates the drive; to provide a unit housing for encasing a worm and worm wheel and the bearings therefor, all of which are maintained in operating relationship by a sealed ball bearing, the outer race of which is secured to the inner wall of the housing by a split spring ring, the inner race of which is retained on a sleeve of the worm wheel by a second spring ring disposed in a groove therein; and in general to provide a unit casing for supporting the worm drive for a lead screw which is simple in construction and which positively maintains the worm and worm wheel in proper mating relationship.

Other objects and features of novelty of the invention will be specifically pointed out or will become apparent when referring, for a better understanding of the invention, to the following description taken in conjunction with the accompanying drawings, wherein:

Figure 1 is a plan view of a housing for supporting a motor and encasing the driving gears of a lead screw;

Fig. 2 is a view of the structure illustrated in Fig. 1 as viewed from line 2—2 thereof;

Fig. 3 is a view of the structure illustrated in Fig. 1 as viewed from line 3—3 of Fig. 2;

Fig. 4 is a sectional view of the structure illustrated in Fig. 1 taken on the line 4—4 thereof; and Fig. 5 is a sectional view of the structure illustrated in Fig. 4 taken on the line 5—5 thereof.

As illustrated in the figures, a housing 10 for supporting the motor and a drive for a lead screw has a hollow body 11 and a rearwardly extending boss 12 provided with an aperture 13. The body 11 has an internal aperture 14 of cylindrical form joined to a tangential aperture 15. An aperture portion 16 outwardly of the portion 14 forms a shoulder 17, and outwardly of the shoulder an annular groove 18 is provided extending within the wall of the aperture portion 16. An aperture 19 in the rearward extending hub portion 12 on the centerline of the aperture portions 14 and 16 has a sleeve bearing 21 press-fitted therein which supports the rear end of a shank 22 of a driven member which may be a lead screw. A worm wheel 23 is mounted on the shank 22 having an extending sleeve portion 24 through which a pin 25 extends into an aperture 26 in the shank 22 for locking the worm wheel on the shank.

A sleeve 24 forms a shoulder 27 with the worm wheel 23 and against this shoulder an inner race 28 of a ball bearing 29 abuts. An annular groove 31 is provided in the sleeve portion 24 for receiving a split spring ring 32 which locks the inner race 28 against the shoulder 27. The outer race 33 of the ball bearing 29 abuts the shoulder 17 and is retained thereagainst by a split spring ring 34 disposed within the annular groove 18 in the inner face of the housing body 11. Rings 32 and 34 lock the worm wheel 23 in position, the shoulder 17 and ring 34 locking the outer race 33 against inward or outward movement relative to the housing, while the ring 32 locks the worm wheel 23 relative to the housing thereby preventing any substantial inward or outward movement of the worm wheel.

The tangential aperture 15 of the housing has an inner aperture 36 in which a sleeve bearing 37 is press-fitted and an outer aperture 38 in which a sleeve bearing 39 is secured. The inner diameter of the bearing 39 is greater than the diameter of a worm 41 which may pass therethrough. A stub shaft 42 on the end of the worm is journalled within the sleeve 37 with the end abutting a set screw 43 which may be adjusted to maintain the center of the length of the worm on the centerline of the worm wheel. An enlarged cylindrical portion 44 is provided on the outer end of the worm 41 disposed in bearing relation with the inner surface of bearing 39. From the end of the cylindrical portion 44 a driving end 45 extends to which the shaft 46 of a motor 47 is secured in driving relation by suitable connecting means 48. Oppositely disposed flanges 49 form mounting means for the motor 47 being secured thereto by suitable means herein illustrated, as by screws 51.

In this arrangement, the unit housing supports the reduction gearing comprising the worm 41 and worm wheel 23 and the mounting means for the driven shank 22 which may be the end of a shaft or of a lead screw. The flanges 49 support the driving motor 47 and form a unit construction therewith. The apertures 13 of the rearwardly extending boss 12 have a pin extending therethrough for mounting the entire assembly on a support in pivotal relation thereto. After the sleeve bearings 21, 37 and 39 are press-fitted within the housing 11 the worm wheel 23 secured on the shank 22 by the pin 25 is then inserted within the housing and retained therein by the ball bearing 29 when secured by the spring rings 32 and 34. The ball bearing 29 is preferably of the self-sealing type, being sealed by the annular sealing element 52. The worm 41 is then advanced into the tangential aperture 15 with the thread in meshed relation with that of the worm wheel 23 and with the cylindrical ends 42 and 44 disposed within the sleeve bearings 37 and 39. The shaft of the motor is then connected to the stub end 45 of the worm and the motor is secured to flanges 49 of the housing. Before assembly, a desired amount of grease may be placed within the interior of the housing to provide lubrication for the bearings and the worm and worm wheel. A vane 53 may be provided between the housing 11 and the support for the upper flange 49 of the motor to add strength thereto.

What is claimed is:

1. In a reduction gear assembly, a unit housing having a three-stepped cylindrical aperture of different diameters, the central aperture being smaller than the outer aperture and larger than the inner aperture and having an aperture disposed in substantially tangential relation thereto, a worm wheel and worm in said central and tangential apertures disposed in meshed relation to each other, a bearing having its outer race disposed against the shoulder between the outer and central apertures, a split ring extending in a groove in the wall of the housing in the outer aperture for retaining said outer ring against the shoulder, a sleeve extension on the worm wheel forming a shoulder therewith engaged by the inner race of the bearing, a split ring within an annular groove in the sleeve extension in engagement with the outer face of the inner race for retaining the worm wheel in aligned relation with the worm, a shaft extending through said worm wheel and sleeve extension into said inner aperture, and a pin extending through said shaft and said sleeve extension of the worm wheel which is retained in position by the inner race of the bearing which extends thereover, the shaft being retained against longitudinal movement in either direction by said pin.

2. In a reduction gear assembly as recited in claim 1, wherein the tangential aperture has an enlarged end from which lateral flanges extend for attachment to a motor housing.

References Cited in the file of this patent

UNITED STATES PATENTS

| | | |
|---|---|---|
| 676,324 | Keiper | June 11, 1901 |
| 1,905,654 | Shields | Apr. 25, 1933 |
| 2,351,060 | McLauthlin | June 13, 1944 |
| 2,657,591 | Kaelin | Nov. 3, 1953 |
| 2,660,028 | Geyer | Nov. 24, 1953 |
| 2,682,780 | Picklee | July 6, 1954 |
| 2,697,016 | Spurgeon | Dec. 14, 1954 |

OTHER REFERENCES

"Product Engineering," December 1933, page 455. Copy in Div. 45.